(No Model.) 3 Sheets—Sheet 1.
M. HAYDEN.
HEATING STOVE.
No. 394,360. Patented Dec. 11, 1888.
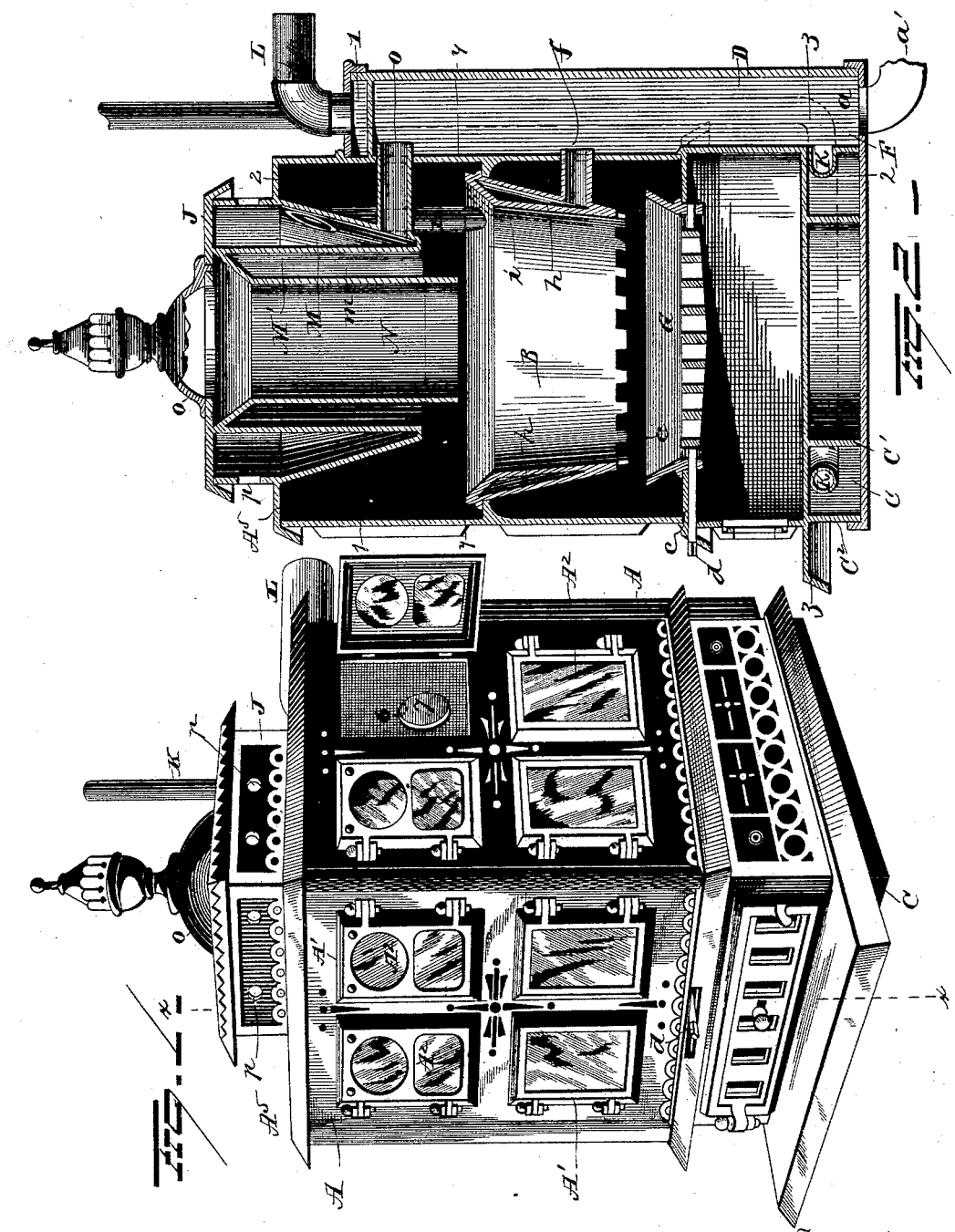
Witnesses.
G. F. Downing
R. S. Ferguson
Inventor,
Marshall Hayden,
By his Attorney
H. A. Seymour.

(No Model.) 3 Sheets—Sheet 2.
M. HAYDEN.
HEATING STOVE.
No. 394,360. Patented Dec. 11, 1888.
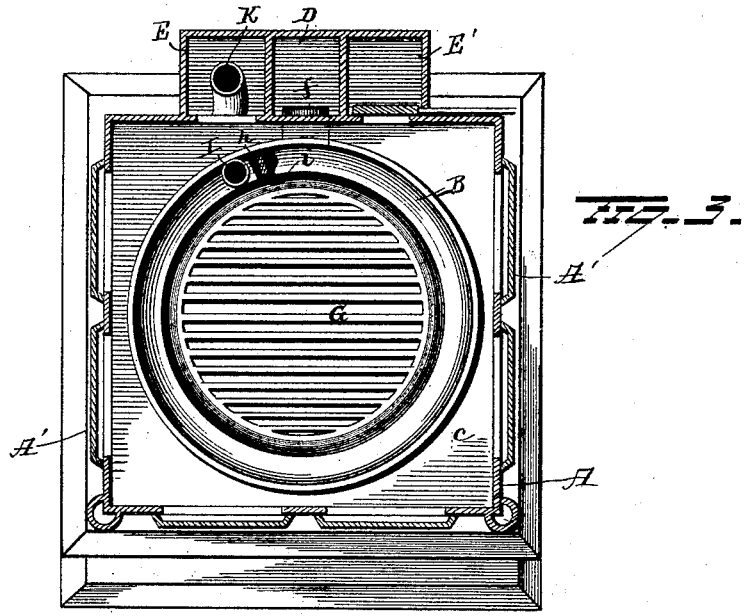
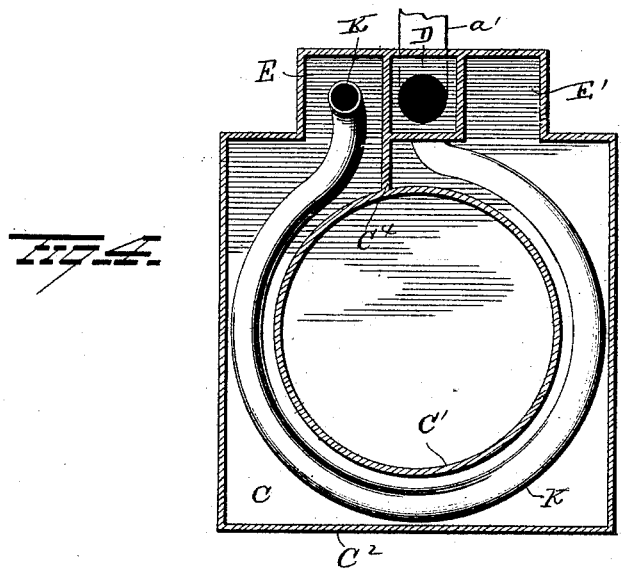
Witnesses.
G. F. Downing
R. S. Ferguson
Inventor.
Marshall Hayden.
By his Attorney
H. A. Seymour.
N. PETERS, Photo-Lithographer, Washington, D. C.

(No Model.) 3 Sheets—Sheet 3.

M. HAYDEN.
HEATING STOVE.

No. 394,360. Patented Dec. 11, 1888.

Witnesses,
G. F. Downing
R. S. Ferguson

Inventor,
Marshall Hayden,
By his Attorney
H. A. Seymour.

UNITED STATES PATENT OFFICE.

MARSHALL HAYDEN, OF NEW MILFORD, PENNSYLVANIA.

HEATING-STOVE.

SPECIFICATION forming part of Letters Patent No. 394,360, dated December 11, 1888.

Application filed February 11, 1888. Serial No. 263,704. (No model.)

*To all whom it may concern:*

Be it known that I, MARSHALL HAYDEN, of New Milford, in the county of Susquehanna and State of Pennsylvania, have invented certain new and useful Improvements in Heating-Stoves; and I do hereby declare the following to be a full, clear, and exact description of the invention, such as will enable others skilled in the art to which it appertains to make and use the same.

My invention relates to an improvement in stoves, and more particularly to a stove for heating purposes.

The object of my present invention is to produce a stove that will afford an extended heating-surface for pure air.

With this object in view my invention consists in certain features of construction and combinations of parts, that will be hereinafter described, and pointed out the claims.

Figure 6:
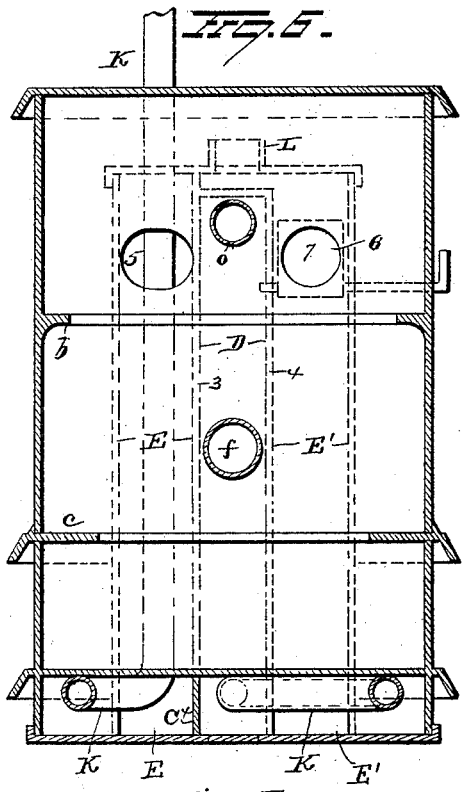
Figure 5:
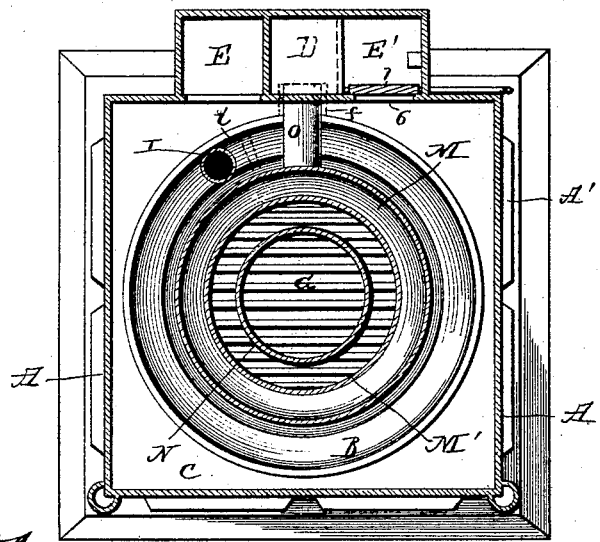

Referring to the drawings, Figure 1 represents a front elevation in perspective, with all but one door closed. Fig. 2 is a side elevation, in section, through the line $x\ x$, Fig. 1, or the center of the stove-front. Fig. 3 is a plan in section of the stove, taken on the line $y\ y$, Fig. 2, or near the top of the cylinder. Fig. 4 represents a plan in section taken on the line $z\ z$, or below the ash-pit, to exhibit the sub-chamber located at this point. Fig. 5 is a plan view, in section, taken on the line 1 1, (see Fig. 2,) or just below the top of the stove. Fig. 6 is a vertical transverse section as viewed from the front of the stove, taken on the line 2 2, Fig. 2.

A represents the outer casing of the stove. It is preferably made of cast-iron, and is provided with the doors A', which are located in double tiers on the front and both sides, as shown. The rear of this casing is extended to form a sub-chamber, A³, in which the several flues are confined. The doors A' are fitted with mica squares A², that from their transparency expose the interior of the stove when lighted by the fire contained in its firepot B.

The stove is shown rectangular in cross-section. This design may be varied, and I do not wish to be confined to the exact form or configuration shown, as it will appear that the novel features of improvement hereinafter described may be combined with a round or polygonal stove-body as well as the shape shown.

At the base of the stove-casing A, a sub-chamber, C, is formed, that is provided with a circular wall, C', (see Fig. 4,) which from its relative position forms a channel or air-space between its vertical wall and the outer wall, C², of said sub-chamber. At the rear side of the stove-casing A there is a vertical rearwardly-projecting passage, F, formed, which extends from the bottom of the sub-chamber C nearly to the top of the casing A. The vertical passage just mentioned is divided into three upright flues by the partitions 3 4. The center flue or passage, D, is located near the center of width of the stove, and is designed to convey pure atmospheric air from the inlet-orifice $a$ upwardly, as will be further explained.

I prefer to attach an air-conductor pipe, $a'$, to cover the orifice $a$ and lead cold air from without the house into the vertical passage D; but I do not confine myself to such a source of air-supply, as it may be directly introduced through the orifice $a$, if preferred.

The two flues E E', that are located on each side of the central air-conduit passage D, extend the full height of this passage. Inspection of Fig. 6 will show two orifices, 5 6, made through the rear wall of the stove-casing A into these flues E E', thus affording communication between the interior of the stove and the sub-chamber C through these flues.

A horizontal flange, $b$, is secured to the four side walls of the casing A at the top of the cylinder B, this cross flange or wall being cut away, so as to receive in the circular orifice made through it the upper portion or edge of the cylinder just named.

The fire-pot B is preferably made circular, and is of the best approved form given baseburning magazine-feeding heating-stoves, its side wall flaring from the lower edge toward its widened top rim, that engages the horizontal flange $b$ and holds the cylinder suspended securely, leaving its lower edge free.

A proper distance below the lower edge of the cylinder B a grate, G, is placed on a cross wall or flange, $c$, which is cut away to produce a round hole concentric with the fire-pot. The grate G may be of any approved form that is best adapted to crush cinder or clinkers and free the bottom of the fire-pot of them. A handle for agitation of the grate is shown at $d$ in the drawings.

To aid in the operation of removal of the scoria formed by coal combustion there is a sufficient space, $e$, left between the lower edge of the fire-pot B and the grate G, which latter should be somewhat larger in diameter than this portion of the cylinder. Below the grate G a capacious ash-pan may be placed, which may be removed at will by sliding it out from the front of the stove.

Returning to a description of the fire-pot B, it should be explained that the wall of the same is made double, with an air-space, $h$, between these two concentric walls, that unite at their top and bottom edges to render them continuous and the interior space air-tight. At the rear of the fire-pot B, near its lower edge, a pipe, $f$, is rearwardly extended, which enters a hole made in the walls of the stove-casing A, and thus provides a proper passage for cold air that ascends the air passage or space $h$, formed between the cylinder-wall, as has been explained. By the interposition of the wall $i$ the air, which is introduced from the vertical passage D through the pipe $f$ into the air-space $h$, will be made to spread out over the entire surface of the cylinder-wall and flow around said cylinder, becoming thoroughly heated in its passage over the hot metal surface thereof before it reaches the exit hot-air pipe I, through which it rises to enter the distributing-chamber J, as has been stated.

In the hot-air conduit-passage formed at the base of the stove, between the walls C′ and C² in sub-chamber C, an air-induction pipe, K, is located. This pipe taps the vertical cold-air passage D near its lower end, then extends around the circular wall C′ until it is opposite the vertical hot-air flue E, into which it enters and is upwardly extended. The pipe K, just described, is of sufficient size to furnish a considerable volume of pure air, which becomes heated by its movement through the pipe, the latter having its wall so held from contact with the top wall of the sub-chamber C that it will be exposed to heat throughout its entire surface, which is in contact with the heated products of combustion. These are conducted down the flue E and around the circular wall C′, to rise through the other flue, E′, and escape through a pipe, L, that is connected to a chimney or other proper escape-flue provided for the purpose.

The hot-air conduit-pipe K may terminate slightly above the top wall of the flue E, or it may be extended to heat another apartment, as may be desired.

In the vertical flue E′, through which the orifice 6 is formed to cause this flue to communicate with the interior of the fire-chamber above the cylinder B, a damper, 7, is placed, which, when elevated, will close the orifice 6 to throw all the draft through the other orifice, 5, into flue E, thence down into sub-chamber C, thence up flue E′, and out of the stove-pipe into the chimney. A partition-wall, C⁴, cuts off the direct passage from one flue to the other and forces the heat-current to flow around the wall C′, as shown in Fig. 4.

The heat-distributing chamber J is shown as a low, square, vertically-projecting compartment mounted on the top plate, A⁵, of the stove-casing A; but it may be varied in form if the design of the stove requires this to render it harmonious with other portions of the exterior. Within this distributing-chamber, and projecting below the latter, an annular air-heating chamber, M, is located. The outer wall of this chamber is preferably made in the shape of an inverted frustum of a cone; but it may be varied to suit the style of the stove. This air-heating chamber M is double-walled, the inner shell being cylindrical and of such a relative diameter to that of the coal-magazine N, which is suspended with its cylindrical shell concentric to it, as to provide an annular space, $m$, between the outer surface of the coal-magazine and the inner wall, M′, of the air-heating chamber M. (See Fig. 2.)

The upper end of the coal-holding magazine N is flared outwardly or made funnel-shaped, its top edge being secured to the under side of the heat-distributing chamber J to line with a hole cut in the top of the chamber J, through which coal or other fuel is inserted into the magazine, this orifice having a close-fitting lid, $o$, placed over it. Several holes, $p$, are made through the side walls of the heat-distributing chamber J to allow the pure hot air that accumulates in the double-walled heating-chamber M to escape into the apartment in which the stove is located. All the heat that is afforded by the extensive heating-surface of the chamber M is thus rendered available to warm pure atmospheric air that enters said chamber through the pipes O and I, which extend between the upper end of the vertical air-passage D and the lower portion of the chamber M, as shown in Fig. 2.

From the foregoing description of the several parts of my improved stove it will be seen that I have made provision for heating pure air and conducting it to the exterior of the stove by three distinct methods.

First, by the use of an air-induction pipe, K, that has its surface heated from contact with the hot products of combustion, which are carried to the base of the stove through the flue E, and, after circulating through the sub-chamber C and surrounding the pipe K, are returned to the upper part of the stove through the flue E′, from which they escape by a proper conduit to the open air, it being understood that cold pure air is furnished to the pipe K by its connection with the vertical air-passage D, as has been explained.

The second means of heating cold air that enters the passage D from a point outside of the stove consists in the introduction of the air from said air-passage to the annular channel or air-space *h*, which is formed between the double walls of the cylinder B, and, after being brought into contact with the entire surface of the fire-pot, is permitted to flow upwardly and be conducted to any desired point of escape by the conduit-pipe I.

The depending air-heating chamber M constitutes the third means provided to utilize the heating properties of fuel consumed in the cylinder B and raise the temperature of air introduced into it and allowed to escape when it is properly warmed.

It is claimed for this stove that economy in the consumption of fuel is remarkable, considering the surface for air-heating that is afforded. I further claim that by the free circulation of air around the wall of the fire-pot B the latter is protected from burning out as soon as in ordinary base-burning stoves.

Many minor changes may be made in the mechanical construction of this stove without departure from the spirit or exceeding the scope of my invention; hence I do not wish to limit its construction to the exact forms shown; but, Having fully described my invention, what I claim as new, and desire to secure by Letters Patent, is—

1. In a heating-stove, the combination, with a stove-casing and a sub-chamber, of smoke-flues, an air-supply pipe located between the flues, and a pipe leading at one end from the air-supply pipe extending through the sub-chamber, and thence through one of the smoke-flues to the place to be heated, substantially as set forth.

2. In a heating-stove, the combination, with an outer casing, a fire-pot, a combustion-chamber, and a flue-chamber having a fresh-air passage therein, and also flues with which the combustion-chamber is in open communication, of a coal-magazine projecting into the combustion-chamber, and an air-heating chamber surrounding the coal-magazine, with its outer surface exposed to the direct rays of heat from the fire in the pot, said air-heating chamber having openings therein above the stove-casing, and an air-pipe through which it is supplied with air from the air-passage, substantially as set forth.

3. In a heating-stove, the combination, with an outer casing, a fire-pot having double walls, a combustion-chamber, and a flue-chamber having a fresh-air passage therein, and also flues with which the combustion-chamber is in open communication, of a coal-magazine and an air-heating chamber surrounding the coal-magazine and communicating with the air-chamber between the walls of the fire-pot, said air-heating chamber having openings therein above the stove-casing, and an air-pipe through which it is supplied with air from the air-passage, substantially as set forth.

In testimony whereof I have signed this specification in the presence of two subscribing witnesses.

MARSHALL HAYDEN.

Witnesses:
E. A. FRENCH,
JOHN W. JAY.